United States Patent
Salsi et al.

(10) Patent No.: US 9,219,548 B2
(45) Date of Patent: Dec. 22, 2015

(54) MODULATOR WITH MARKING OF POLARIZATION

(75) Inventors: Massimiliano Salsi, Nozay (FR); Jeremie Renaudier, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 111 days.

(21) Appl. No.: 13/496,669

(22) PCT Filed: Sep. 15, 2010

(86) PCT No.: PCT/FR2010/051914
§ 371 (c)(1),
(2), (4) Date: Apr. 9, 2012

(87) PCT Pub. No.: WO2011/039442
PCT Pub. Date: Apr. 7, 2011

(65) Prior Publication Data
US 2012/0189307 A1    Jul. 26, 2012

(30) Foreign Application Priority Data
Sep. 30, 2009   (FR) .................... 09 56793

(51) Int. Cl.
| | | |
|---|---|---|
| *H04B 10/00* | (2013.01) | |
| *H04B 10/08* | (2006.01) | |
| *H04B 10/04* | (2006.01) | |
| *H04B 10/06* | (2006.01) | |
| *H04B 10/556* | (2013.01) | |

(Continued)

(52) U.S. Cl.
CPC ............ *H04B 10/5561* (2013.01); *H04B 10/60* (2013.01); *H04J 14/002* (2013.01); *H04J 14/06* (2013.01); *H04B 10/2575* (2013.01); *H04B 2201/70727* (2013.01); *H04B 2210/074* (2013.01); *H04B 2210/075* (2013.01)

(58) Field of Classification Search
None
See application file for complete search history.

(56) References Cited

U.S. PATENT DOCUMENTS 7,636,525 B1* 12/2009 Bontu et al. ............... 398/208
7,684,712 B1*  3/2010 Roberts et al. ............ 398/208
(Continued)

FOREIGN PATENT DOCUMENTS

| EP | 2045935 | 4/2009 |
| WO | 2006045324 | 5/2006 |

(Continued)

OTHER PUBLICATIONS

Chartier, Germain. Introduction to Optics, 2005, Springer Science & Business Media, Inc., pp. 149-150.*

(Continued)

*Primary Examiner* — Ken Vanderpuye
*Assistant Examiner* — Jai Lee
(74) *Attorney, Agent, or Firm* — Patti & Malvone Law Group, LLC (57) ABSTRACT

A modulator with polarization marking comprising two input ports for receiving two optical signals at one wavelength, and exhibiting essentially perpendicular optical polarization states, capable of phase-modulating those signals with data signals and of combining them with polarization, characterized in that it comprises a source of phase overmodulation for overmodulating the phase of one of said two optical signals, said phase overmodulation exhibiting a modulation frequency substantially lower than the modulation frequency of said data signals. A method and a coherent receiver are also disclosed.

12 Claims, 4 Drawing Sheets

(51) Int. Cl.
*H04B 10/60* (2013.01)
*H04J 14/00* (2006.01)
*H04J 14/06* (2006.01)
*H04B 10/2575* (2013.01)

(56) References Cited

U.S. PATENT DOCUMENTS

| | | | |
|---|---|---|---|
| 8,306,431 B2* | 11/2012 | Takahara | 398/152 |
| 2002/0071476 A1* | 6/2002 | Park | 375/130 |
| 2005/0068985 A1 | 3/2005 | Li | |
| 2009/0148164 A1* | 6/2009 | Roberts et al. | 398/65 |
| 2009/0257755 A1* | 10/2009 | Buelow | 398/184 |
| 2009/0274469 A1* | 11/2009 | Yuki et al. | 398/152 |
| 2010/0098420 A1* | 4/2010 | Ibragimov et al. | 398/65 |
| 2010/0150555 A1* | 6/2010 | Wang et al. | 398/65 |
| 2010/0215374 A1* | 8/2010 | Liu et al. | 398/98 |
| 2010/0232809 A1* | 9/2010 | Cai et al. | 398/202 |
| 2010/0329698 A1* | 12/2010 | Nakashima | 398/208 |

FOREIGN PATENT DOCUMENTS

| | | |
|---|---|---|
| WO | 2008117292 | 10/2008 |
| WO | 2009081237 | 7/2009 |

OTHER PUBLICATIONS

Madisetti et al., Digital Signal Processing Handbook, 1999, CRC Press LLC., Section 24.6.3.*
Madisetti et al., Digital Signal Processing Handbook, 1999, CRC Press LLC, Section 24.6.3.*
Chartier, Introduction to Optics, 2005, Springer Science+Business Media, Inc., pp. 149-151.*
Charlet, Gabriel, Coherent detection associated with digital signal processing ofr fiber optics communication, 2008, Elsevier, pp. 1019-1022.*
Savoy, J. Seb, Digital filters for coherent optical receivers, 2008, Optics Express, pp. 806-808.*
Ip et al., Coherent detection in optical fiber systems, 2008, Optics Express, pp. 753-791.*
Ho, Keang-Po, Phase-Modulated Optical Communication Systems, 2005, Springer Science, p. 36.*
Chartier, Germain, Introduction to Optics, 2005, Springer Science, p. 149-151.*
Chartier, Introduction to Optics, 2005, Springer Science+Business Media Inc., p. 149-151.*
Charlet, Coherent detection associated with digital signal processing for fiber optics communication, 2008, Elsevier Masson SAS, pp. 1012-1030.*
Ho K., Phase-Modulated Optical Communication Systems, 2005, Springer Science+Business Media, Inc., p. 36.*
Savory S., Digital filters for coherent optical receivers, 2008, Optical Express, pp. 804-817.*
Lach et al., Optical Fiber Technology: Modulation formats for 100G and beyond, 2011, Elsevier Inc., pp. 380-381.*
Chan, Optical Performance Monitoring: Advanced Technique for Next-Generation Photonic Networks, 2010, Elsevier Inc, p. 128.*
Charlet et al; Coherent detection associated with digital signal processing for fiber optics communication; Comptes Rendus; Physique, Elsevier, Paris, France; LNKD-DOI:10.1016/J.CRHY.2008.10.019; vol. 9, No. 9-10; Nov. 1, 2008; pp. 1012-1030; XP026053396; ISSN: 1631-0705.
Savory, Seb J.; Digital filters for coherent optical receivers; Optics Express, OSA Optical Society of America; Washington DC; LNKD-DOI:10.1364/OE.16.000804; vol. 16, No. 2; Jan. 21, 2008; pp. 804-817; XP007906766; ISSN: 1094-4087.

* cited by examiner

MODULATOR WITH MARKING OF POLARIZATION

TECHNICAL FIELD

The invention pertains to an optical communication system, at one of the ends of which polarization-multiplexed optical signals are emitted to transport data. More particularly, some embodiments of the invention relate to systems in which the data is encoded by phase modulation and which use coherent detection. The invention may be applied when the optical medium is constituted by a fiber connection, though other optical propagation media may be considered. It may also be used in networks that transmit a single wavelength or networks that transmit multiple wavelengths, such as WDM (Wavelength Division Multiplexing) networks.

BACKGROUND

Coherent optical detection chains are known for detecting polarization-multiplexed signals after their propagation within an optical medium.

A coherent receiver is described in "Digital filters for coherent optical receivers" by Seb. J Savory (*Optics Express*, 21 Jan. 2008, Vol. 16, #2, pages 804 to 817). In this document, the receiver comprises an optical stage followed by an electronic stage. The optical stage receives the polarization-multiplexed signal after it has passed through an optical medium, often a birefringent one, such as an optical fiber. The optical stage particularly comprises an optical polarization splitter and a mixer for mixing polarization components of the received signal with the corresponding polarization components of a local oscillator signal; this optical stage of the receiver is sometimes called a 90° optical hybrid. Four analog electrical signals are obtained at the output of the optical stage and are delivered to the coherent receivers electronic stage. The coherent receiver is made up of multiple stages, the first one being an analog/digital conversion stage (A/D stage) for producing four digital electrical signals. These signals are then processed in multiple other electronic stages that may perform clock recovery, resequencing, chromatic dispersion compensation, polarization demultiplexing, carrier recovery, and symbol estimation functions. The coherent receiver delivers to electrical signals $E_1$ and $E_2$ which carry the data initially transported by the two polarization-multiplexed optical signals $O_1$ and $O_2$ injected into the optical medium.

One difficulty of coherent detection is knowing how to combine the two detected electrical signals $E_1$ and $E_2$ with the two optical signals injected into the optical connection, $O_1$ and $O_2$ without inverting them.

There is therefore a need to know how to identify the right match between the optical signals $O_1$ or $O_2$ and the detected signals $E_1$ or $E_2$.

SUMMARY

The invention provides an optical signal modulator comprising a first modulator input port for receiving a first optical signal exhibiting a first optical polarization state at one wavelength, and a second modulator input port for receiving a second optical signal exhibiting a second optical polarization state at said wavelength, said first optical polarization state being roughly orthogonal to said second optical polarization state, a first data modulator for phase-modulating said first optical signal with a first data signal, thereby giving a third optical signal at said wavelength, a second data modulator for phase-modulating said second optical signal with a second data signal, thereby giving a fourth optical signal at said wavelength, and a combiner for producing a fifth optical signal at said wavelength on a combiner output port of said combiner, said fifth optical signal being a combination of said third optical signal received on a first combiner input port of said combiner and of said fourth optical signal received on a second combiner input port of said combiner, characterized in that it comprises a phase overmodulation source for producing a phase overmodulation signal for overmodulating the phase of one of said first, second, third, and fourth optical signals, and in that said phase overmodulation signal exhibits a modulation frequency significantly lower than the modulation frequency of said first data signal and second data signal.

Advantageously, the modulator is such that said phase overmodulation source is connected to at least one port of said first data modulator or of said second data modulator or of said phase overmodulator.

Preferentially, the modulator additionally comprises a polarization splitter capable of receiving a sixth optical signal at said wavelength and of producing said first optical signal and said second optical signal from said sixth optical signal.

Advantageously, the modulator is such that said first polarization state and second polarization state are roughly rectilinear optical polarization states.

Preferentially, the modulator is such that said first data modulator and said second data modulator are capable of producing QPSK modulations.

Advantageously, the modulator is such that at least one of said first data modulator, second data modulator, and phase overmodulator is a $LiNbO_3$ modulator.

The invention also provides a method for generating an optical signal comprising the steps consisting of:

applying a first data signal in order to phase-modulate a first optical signal exhibiting a first polarization state, thereby giving a third optical signal, applying a second data signal in order to phase-modulate a second optical signal exhibiting a second polarization state roughly orthogonal to the first polarization state, thereby giving a fourth optical signal, and producing a fifth optical signal by combining said third optical signal and said fourth optical signal, characterized in that it also comprises the steps consisting of applying a phase overmodulation to one of said first, second, third, and fourth optical signals, said phase overmodulation exhibiting a modulation frequency substantially greater than the modulation frequency of said first and second data signals.

Preferentially, the method is such that said third optical signal and said fourth optical signal are QPSK signals. Alternatively, other phase modulation formats are possible, such as BPSK.

The invention also provides a coherent receiver capable of receiving a PM-QPSK optical signal comprising a polarization separation stage capable of producing a first electrical signal and a second electrical signal respectively representing a first polarization component and a second polarization component of said PM-QPSK signal, a first carrier recovery stage for receiving said first electrical signal and a second carrier recovery stage for receiving said second electrical signal, characterized in that it also comprises, a phase analyzer capable of extracting a first piece of phase spectrum information from said first electrical signal and a second piece of phase spectrum information from said second electrical signal, end of comparing said first piece of phase spectrum information and said second piece of phase spectrum information.

Preferentially, the coherent receiver is such that said phase analyzer comprises a first calculator for calculating a Fourier transform of said first electrical signal and a second calculator for calculating a Fourier transform of said second electrical signal.

Advantageously, the coherent receiver comprises an optical stage and an electronic stage, said optical stage being able to produce, from said PM-QPSK optical signal, a third electrical signal, a fourth electrical signal, a fifth electrical signal, and a six electrical signal, said electronic stage (117) comprising a resynchronization and normalization stage which may, by re-synchronizing and normalizing said third electrical signal, fourth electrical signal, fifth electrical signal, and sixth electrical signal, respectively produce seventh, eighth, ninth, and tenth electrical signals, a first stage of reconstructing a complex signal, which may, by an operation of combining said seventh electrical signal and eight electrical signal, produce an eleventh electrical signal, and a second stage of reconstructing a complex signal, which may, by an operation of combining said ninth electrical signal and tenth electrical signal, produce a twelfth electrical signal, two chromatic dispersion compensation electronic stages, which may, by an operation of electronic chromatic dispersion compensation, respectively produce a thirteenth electrical signal from said eleventh electrical signal and a fourteenth electrical signal from said twelfth electrical signal, said polarization separation stage being capable of producing the first electrical signal from said thirteenth electrical signal, and of producing said second electrical signal from said fourteenth electrical signal.

Preferentially, the coherent receiver is such that said polarization demultiplexer uses a constant modulus algorithm.

An experimental observation that the basis of the invention is that amplitude overmodulation cannot be used to mark an optical signal $O_1$ according to one optical polarization, if used in combination with a coherent receiver whose electronic polarization separation stage uses a constant modulus algorithm. This is because this algorithm assumes that the amplitudes of the two electrical signals that it must demultiplex are similar. Until the electronic polarization separation stage has provided two signals at its outputs exhibiting close amplitudes, the algorithm continues its calculation until it has provided two demultiplexed electrical signals with similar amplitudes. Digital simulations have shown that the electronic polarization separation stage erases the amplitude overmodulation marking of an optical signal $O_1$, rendering that marking useless for discerning which of the signals $E_1$ and $E_2$ separated by the coherent receiver corresponds to signal $O_1$ and which to signal $O_2$. Certain aspects of the invention into resolve this difficulty.

DESCRIPTION OF THE DRAWINGS

The invention will be better understood, and other purposes, details, characteristics, and advantages thereof will become more clearly apparent upon examining the following description of one particular embodiment of the invention, which is given only by way of an illustrative and non-limiting example, with reference to the attached drawings. In these drawings.

DETAILED DESCRIPTION

Figure 1:
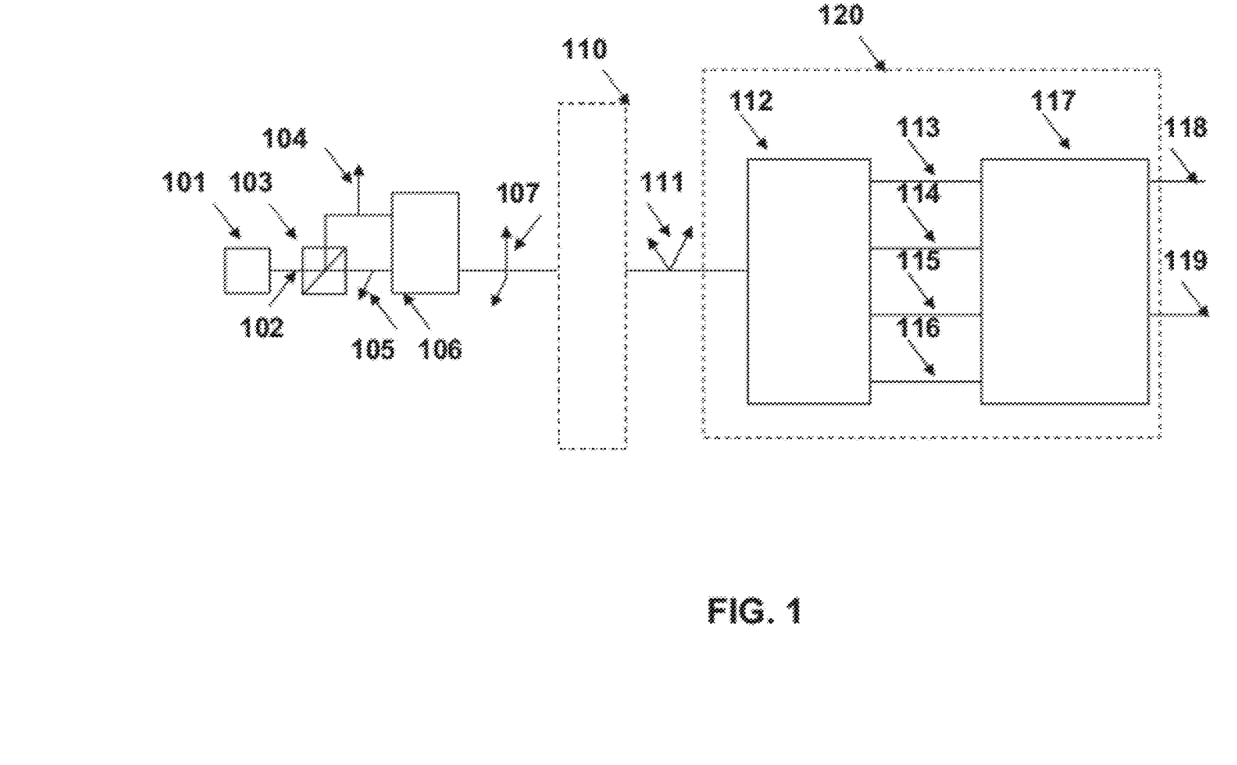
FIG. 1 is a schematic depiction of a coherent optical communication system that uses polarization multiplexing, wherein embodiments of the invention may be implemented.

FIG. 1 schematically depicts an optical communication system using polarization multiplexing. A constant-power optical source 101 emits an optical signal 102 on a wavelength. The constant-power optical source 101 is connected directly to a polarization separator 103. The polarization separator 103 separates the optical signal 102 into two optical signals 104 and 105 on the same wavelength. The signals 104 and 105 exhibit substantially perpendicular polarization. The two optical signals 104 and 105 are received on two input ports of the modulator with polarization marking 106, which delivers, at its output, a signal 107 on the same wavelength. The signal 107 is constituted by superimposing two essentially perpendicular polarization signals, both of which carry data or binary flows. The mode for obtaining the optical signal 107 from the optical signals 104 and 105 will be described in greater detail below in connection with FIG. 2. The optical signal 107 is injected into an optical propagation medium 110, for example into an optical fiber. An optical signal 111 at the same wavelength is obtained at the output of the optical medium 110. The optical signal 111 may potentially be carried by a different wavelength than the signal 107 if the optical medium 110 comprises wavelength conversion means. Due to the propagation within the medium 110 which may exhibit variable birefringence over time, the optical signal 111 exhibits a polarization state that is generally not the same as that of the signal 107. The signal 111 Is received at the input of a coherent optical receiver made up of an optical stage 112 and an electronic stage 117. The optical stage 112 delivers four analog electrical signals 113, 114, 115 and 116 to the electronic stage 117, whose function is to convert these four analog signals into to digital signals 118 and 119. The coherent optical receiver made up of stages 112 and 117 is designed in such a way that the digital electrical signals 118 and 119 faithfully represent the data, or binary flows, carried by the two optical polarization signals whose perpendicular optical polarizations form the multiplexed signal 107.

In the invention's presented usage mode, the optical medium 110 may be more precisely, though without this example given for illustrative purposes being considered a limitation of the invention, a point-to-point optical fiber connection made up of different optical elements connected to one another and not depicted: these elements may, for example, be lengths of fibers between which optical signal amplification modules, chromatic dispersion compensation modules, and other elements are inserted. In fact, the nature and number of the elements that form the optical medium 110 are not limited. In other embodiments of the invention, the optical medium 110 might not implement an optical fiber, for example in the case of unguided airborne optical propagation, such as the one used for example to access fiber-less optical communications or in analysis experiments of birefringent optical mediums 110, and other applications.

Figure 2:
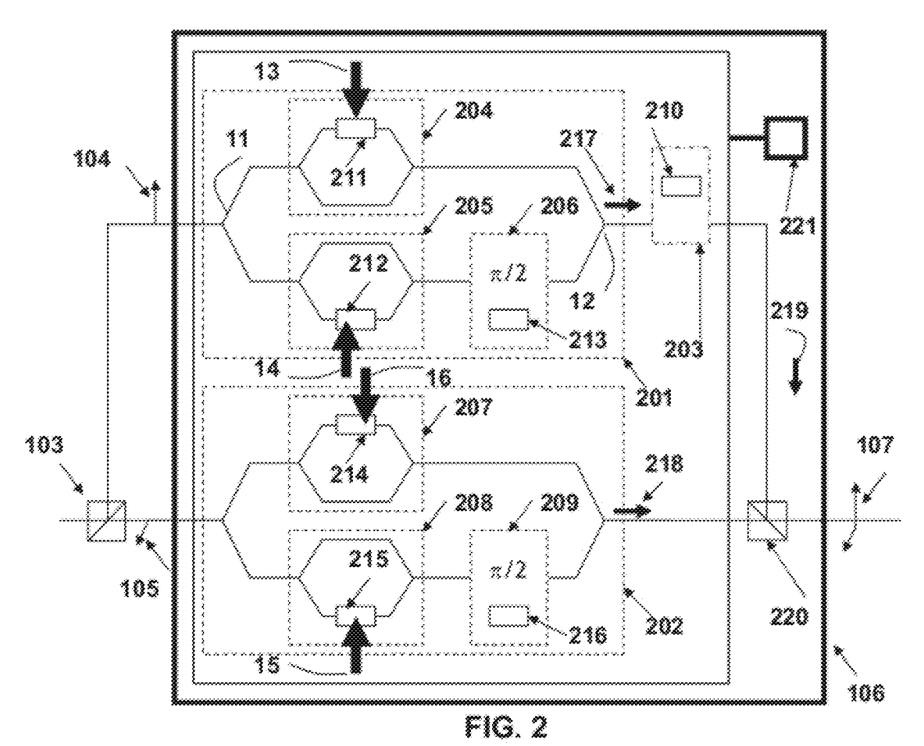
FIG. 2 depicts a modulator with polarization marking according to an embodiment of the invention.

FIG. 2 schematically depicts a modulator 106 with polarization marking according to one possible embodiment of the invention. The modulator 106 is constituted by two modulators 201 and 202 for data encoding in QPSK format (Quadrature Phase-Shift Keying). The modulators 201 and 202 receive the optical signals 104 and 105 that have essentially perpendicular optical polarizations. The modulators 201 and 202 make it possible to phase-modulate the optical signals 104 and 105 respectively, thereby delivering two modulated optical signals 217 and 218 in QPSK format. The signals 217 and 218 carry data or binary flows. The modulator 106 also comprises an optional phase overmodulator 203, for overmodulating the optical signal 217 and converting it into an optical signal 219. The role of the overmodulator 203 will be explained below. The signals 219 (or the signal 217 in the absence of the overmodulator 203, because that modulator is optional, as indicated above) and the signal 218 are combined by a polarization-combining prism at number 220 for providing the signal 107 formed by superimposing the two signals 219 (or 217 in the absence of the overmodulator 203) and 218.

The modulator 201 comprises two Mach-Zehnder interferometers 204 and 205. It is formed by a 1:2 input coupler 11 for receiving the optical signals 104 and a 2:1 output coupler 12 for delivering the optical signal 217, these two couplers being connected by two arms. The upper arm in FIG. 2 comprises a Mach-Zehnder interferometer 204. The lower arm of the 201 carries another Mach-Zehnder interferometer 205 installed serially with a $\pi/2$ phase shifter 206. An electrode 211 receives a data signal 13 for modulating by $\pi$ hops the phase of an optical signal passing through the modulator 204. An electrode 212 receives a data signal 14 for modulating by $\pi$ hops the phase of an optical signal passing through the modulator 204. An electrode 213 receives a signal for phase-shifting by $\pi/2$ the optical signal transmitted by the modulator 205. The signal 217 is obtained by combining a first optical signal obtained at the output of the modulator 204 and a second optical signal obtained at the output of the phase shifter 206, this combination being carried out by the 2:1 coupler 12, at the output of the modulator 201. The modulator 201 thereby constructed itself constitutes a Mach-Zehnder interferometer.

The modulator 202 is constituted in the same manner.

The person skilled in the art will recognize that the Mach-Zehnder interferometers 204, 206, 207 and 208 may alternatively use each of several electrodes, for example one on each of the two arms each forming those interferometers, to apply modulation signals in a push-pull arrangement. Generally speaking, the modulators 204, 205, 207 and 208 as well as the phase shifters 206 and 209 may each use a number of electrodes different from the one depicted in FIG. 2, which depict a single electrode for each of them, for the sake of clarity.

Each of the modulators 201 and 202 thereby described makes it possible to deliver a modulated optical signal in QPSK format in order to carry data or binary flows. The signal 217 is therefore a signal in QPSK format whose optical polarization is essentially close to that of the signal 104, as a discrepancy between these polarization states may arise from the birefringence of the modulator 201. Likewise, the signal 218 is therefore a signal in QPSK format whose optical polarization is essentially close to that of the signal 105, as a discrepancy between these polarization states may arise from the birefringence of the modulator 202. The polarization combining prism 220 delivers the optical signal constituted by the superimposition of two optical signals, on two essentially perpendicular polarizations (as the polarizations of signals 104 and 105 are), each of the signals carrying data encoded in QPSK format. The signal 107 is therefore a signal in PM-QPSK format, for Polarization Multiplexed-Quadrature Phase-Shift Keying. The signal 111 transmitted by the optical medium 110 may also be described as a PM-QPSK signal.

In FIG. 2, a low-frequency signal source 221 applies an overmodulation signal to the electrode 210 of the modulator 203. Likewise, a phase overmodulation may be presented on the signal 219. One of the two polarization components that constitutes the signal 107, and more precisely the signal 219, is therefore a signal in QPSK format, which additionally exhibits a phase overmodulation caused by the modulator 203.

An electrode 210 of the overmodulator 203 applies a modulation signal that makes it possible to obtain the optical signal 219 by overmodulating the phase of the signal 217. As previously indicated, the overmodulator 203 is optional. The overmodulator 203 may alternatively comprise multiple electrodes, not just the one electrode 210. The overmodulator 203 may also be inserted in different locations on the modulator 106, according to arrangements that are not depicted. It may thereby be placed between the separator 103 and the modulator 201. It may alternatively be placed on the upper arm of the Mach-Zehnder interferometer constituting the modulator 201, upstream or downstream of the modulator 204. It may also be placed on the lower arm of the Mach-Zehnder interferometer constituting the modulator 201, for example upstream of the modulator 205, or downstream of the phase shifter 213, or between those two elements.

According to one variant embodiment, the overmodulator 203 is absent, so as to reduce the cost of producing the modulator 106. If so, the overmodulation signal delivered by the source 221 may, for example, be applied to one of the electrodes of the modulator 204. The modulation signal may, more generally speaking, be applied to at least one of the electrodes of an element of the upper arm of the modulator 206. Thus, a phase overmodulation polarization marking may be present on the signal 117 by applying the overmodulation signal delivered by the overmodulation source 221 to at least one of the electrodes of the modulator 204 or of the modulator 205 or of the phase shifter 206. Alternatively, the phase overmodulation polarization marking may be present on the signal 218 by applying the overmodulation signal delivered by the overmodulation source 221 to at least one of the electrodes of the modulators 207 or 208 or of the phase shifter 209. One of the signals that constitutes the signal 107, meaning the signal 217 or the signal 218, is a signal in QPSK format, additionally exhibiting a phase overmodulation for the polarization marking.

This overmodulation may advantageously be an overmodulation whose modulation frequency is substantially lower than the modulation frequency of the data in QPSK format. As will become apparent afterward in connection with the description of FIGS. 3 and 4, the phase overmodulation of one of the two polarization components of the transmitted optical signal will make it possible to tell, during the demultiplexing of the signals and obtaining of signals 118 and 119 (FIG. 1), which of those two signals corresponds to the data in QPSK format carried by the signals 217 and 218. Advantageously, a frequency overmodulation substantially lower than the modulation frequency of the data in QPSK format must be understood as being a frequency that may easily be separated by electrical filtering means within the electrical stage 117 (FIG. 1).

Figure 3:
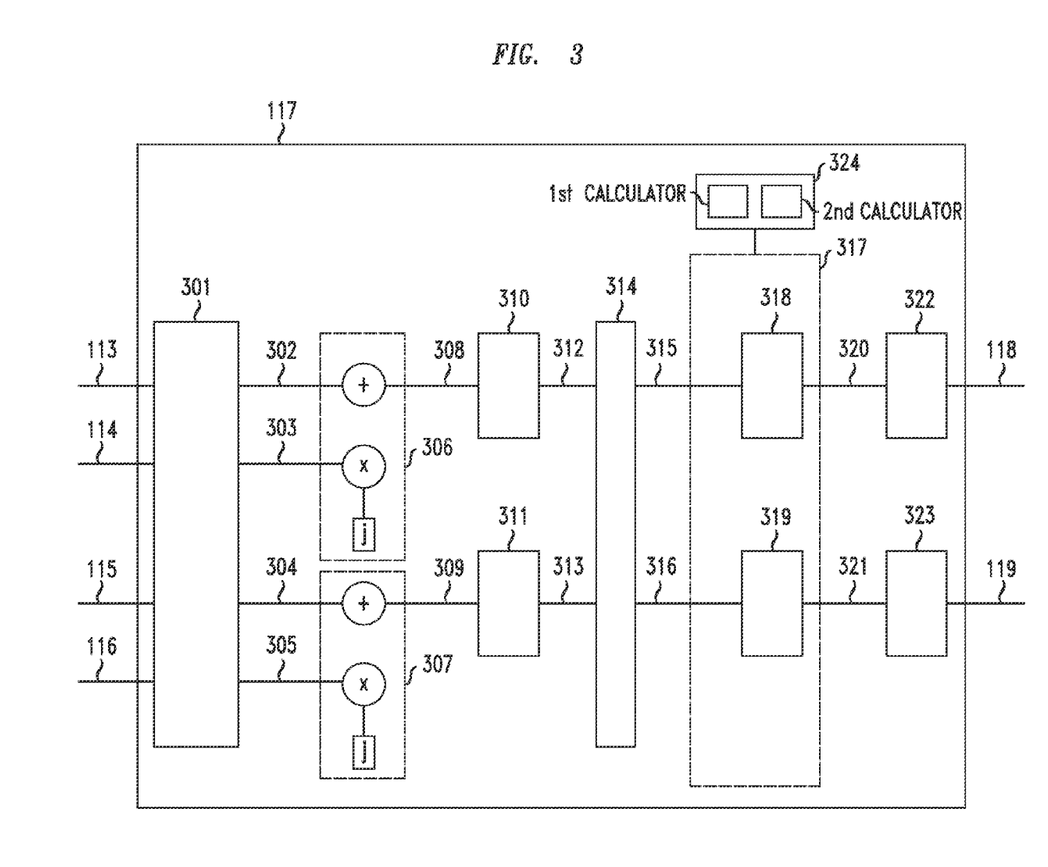
FIG. 3 depicts some elements of the electronic stage of a coherent receiver, according to one possible embodiment of the invention.
Figure 4A:
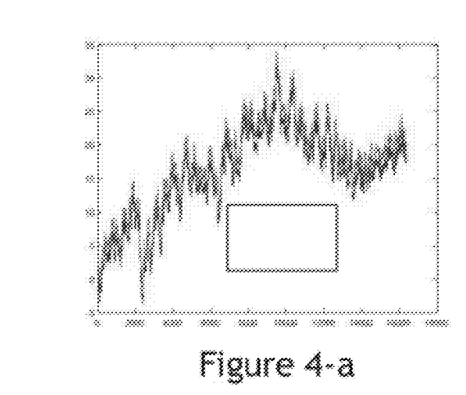
FIG. 4 depicts phase signals obtained by digital simulation and illustrating the benefit of polarization marking that may be achieved through one embodiment of the invention.
Figure 4B:
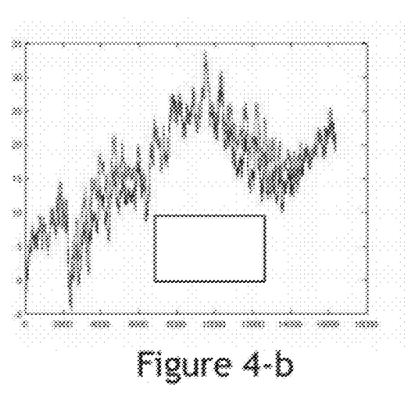
Figure 4C:
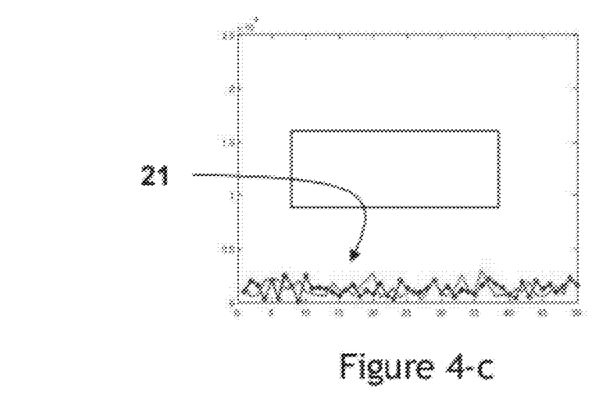
Figure 4D:
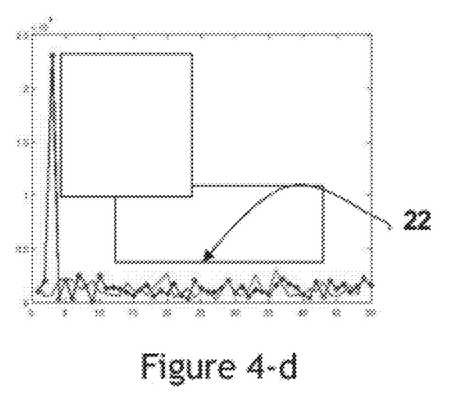

FIG. 3, schematically depicts the electronic stage of a coherent receiver that can decode the signal 107 based on the reception of a signal 111 (FIG. 1).

Among the elements of the electronic stage depicted in FIG. 3, some elements are already known and are, for example, described in "Digital filters for coherent optical receivers" by Seb. J Savory (Optics Express, 21 Jan. 2008, Vol. 16, #2, pages 804 to 817). A resynchronization and normalization stage 301 converts the analog electrical signals 113, 114, 115 and 116 provided by the optical stage 112 (FIG. 1) into four resynchronized and normalized digital signals, respectively 302, 303, 304 and 305. A stage 306 for reconstructing a complex signal makes it possible to obtain the electrical signal 308 by combining signals 302 and 303. Likewise, a stage 307 for reconstructing a complex signal makes it possible to obtain the electrical signal 309 by combining signals 304 and 305. An electronic chromatic dispersion compensation stage 310 makes it possible to obtain an electrical signal 312 based on the signal 308. Likewise, an electronic chromatic dispersion compensation stage 311 makes it possible to obtain an electrical signal 313 based on the signal 309. A polarization demultiplexer 314 using a constant modulus algorithm (CMA) delivers the electrical signals 315 and 316 by demultiplexing the signals 312 and 313. A carrier recovery stage 318 delivers electrical signal 320 based on the signal 315 and a carrier recovery stage 319 delivers an electrical signal 320 based on the signal 315. Carrier recovery stage 318 and carrier recovery stage 319 are connected directly to output ports of polarization demultiplexer 314. Two symbol estimation stages 322 and 323 deliver, based on the signals 320 and 321 respectively, the electrical signals 118 and 119. One of the two electrical signals 118 and 119 carries the data applied by the modulator 201 (FIG. 2) on a first polarization component of the transmitted signal, i.e. the data from signals 13 and 14. To tell which one, the one of the two which is carrying the trace of the phase overmodulation is sought out.

FIG. 3 additionally shows a phase analyzer 324 capable of extracting and comparing phase information from the signal 315, which is present within the carrier recovery stage 318, and phase information from the signal 316, which is present within the carrier recovery stage 319. As will become apparent in connection with FIG. 4, the phase overmodulation marking of one of the two polarization components that constitutes the signal 107 is detectable within the carrier recovery stage 318 or 319 that corresponds to whichever one of the two polarization components of signal 107 (FIG. 2) carries the phase overmodulation.

FIG. 4-b, depicts, based on digital simulations (arbitrary units), phase information contained within whichever one of the signals 315 and 316 corresponds to the polarization component of the signal 107 that carries the phase overmodulation marking. FIG. 4-a depicts phase information contained within whichever one of the signals 315 and 316 corresponds to the polarization component of the signal 107 that does not carry the phase overmodulation marking. If a numerical Fourier transform is applied to the information provided in FIGS. 4-a and 4-b, the phase spectra 21 and 22 shown in FIGS. 4-c and 4-d are respectively obtained. The spectrum in FIG. 4-d clearly shows, in the low frequencies, a signal that distinguishes it from the spectrum in FIG. 4-c. This signal corresponds to overmodulation at a frequency that is essentially less than the frequency of the QPSK data, as previously indicated. This phase of marking signal makes it possible to tell which of the signals 320 and 321 (FIG. 3), and consequently, which of the signals 118 and 119 (FIGS. 1 and 3) corresponds to the data or binary flows carried by the optical signals 217 (FIG. 2). Likewise, the spectrum that does not show low-frequency overmodulation makes it possible to identify, from among signals 118 and 119, which one corresponds to the data carried by the optical signal 218.

In order to simplify the schematic depiction of FIG. 3, a single phase analyzer 324 is shown, whose function is to calculate and compare the phase information present within the assembly 317 constituted by the carrier recovery stages 318 and 319. This comparison is made between Fourier transforms of phase information present within those two stages, or by other types of digital manipulation of signals 315 and 316.

To identify the initial polarization components, it is also possible to mark both of them using different overmodulations, for example ones with different frequencies. In this situation, the analysis of spectra 21 and 22 shows peaks at two different frequencies, similarly making it possible to assign the modulated data 118 and 119 to the respective initial polarization components.

Although the invention has been described in connection with multiple specific embodiments, it is naturally not in any way limited to them, and comprises all technical equivalents of the means described, as well as their combinations, if said combinations fall within the scope of the invention.

The use of the verb "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple means or modules may be depicted by a single hardware element.

In the claims, any reference sign within parentheses should not be interpreted as limiting the claim.

The invention claimed is:

1. A coherent receiver configured to receive a Polarization Multiplexed-Quadrature Phase-Shift Keying (PM-QPSK) optical signal comprising:
   a polarization separation stage configured to produce a first electrical signal and a second electrical signal that represent respectively a first polarization component and a second polarization component of said PM-QPSK signal;
   a first carrier recovery stage configured to receive said first electrical signal and a second carrier recovery stage configured to receive said second electrical signal, said first carrier recovery stage and said second carrier recovery stage being connected directly to output ports of said polarization separation stage; and
   a phase analyzer configured to extract a first piece of phase spectrum information from said first electrical signal and a second piece of phase spectrum information from said second electrical signal, and to compare said first piece of phase spectrum information and said second piece of phase spectrum information, wherein said phase analyzer comprises a first calculator configured to calculate a Fourier transform of said first electrical signal and a second calculator configured to calculate a Fourier transform of said second electrical signal.

2. The coherent receiver according to claim 1, comprising:
   an optical stage and an electronic stage, said optical stage being configured to produce, based on said PM-QPSK optical signal, a third electrical signal, a fourth electrical signal, a fifth electrical signal and a sixth electrical signal;
   said electronic stage comprising
   a resynchronization and normalization stage configured to resynchronize and normalize said third electrical signal, said fourth electrical signal, said fifth electrical signal and said sixth electrical signal respectively, to produce a seventh electrical signal, an eighth electrical signal, a ninth electrical signal and a tenth electrical signal;
   a first stage configured to reconstruct a complex signal, which, by an operation of combining said seventh electrical signal and eighth electrical signal, produces an eleventh electrical signal;

a second stage configured to reconstruct a complex signal, which, by an operation of combining said ninth electrical signal and said tenth electrical signal, produces a twelfth electrical signal; and two chromatic dispersion compensation electronic stages, which, by an operation of electronic chromatic dispersion compensation, respectively produces a thirteenth electrical signal from said eleventh electrical signal and a fourteenth electrical signal from said twelfth electrical signal, said polarization separation stage being configured to produce the first electrical signal from said thirteenth electrical signal, and to produce said second electrical signal from said fourteenth electrical signal.

3. The coherent receiver according to claim 1, wherein said polarization separation stage uses a constant-modulus algorithm.

4. The coherent receiver according to claim 2, wherein the optical stage is configured to receive an optical signal from an optical signal receiver comprising:
- a first modulator input port configured to receive a first optical signal exhibiting a first optical polarization state at a wavelength;
- a second modulator input port configured to receive a second optical signal exhibiting a second optical polarization state at said wavelength, wherein said first optical polarization state is about orthogonal to said second optical polarization state;
- a first data modulator for phase-modulating said first optical signal with a first data signal, thereby giving a third optical signal at said wavelength;
- a second data modulator for phase-modulating said second optical signal with a second data signal, thereby giving a fourth optical signal at said wavelength; and
- a combiner configured to produce a fifth optical signal at said wavelength on a combiner output port of said combiner, said fifth optical signal being a combination of said third optical signal received on a first combiner input port of said combiner and said fourth optical signal received on a second combiner input port of said combiner.

5. The coherent receiver according to claim 2, wherein the optical stage is configured to receive an optical signal from an optical signal receiver comprising:
- a first modulator input port configured to receive a first optical signal exhibiting a first optical polarization state at a wavelength;
- a second modulator input port configured to receive a second optical signal exhibiting a second optical polarization state at said wavelength, wherein said first optical polarization state is about orthogonal to said second optical polarization state;
- a first data modulator for phase-modulating said first optical signal with a first data signal, thereby giving a third optical signal at said wavelength;
- a second data modulator for phase-modulating said second optical signal with a second data signal, thereby giving a fourth optical signal at said wavelength; and
- a combiner configured to produce a fifth optical signal at said wavelength on a combiner output port of said combiner, said fifth optical signal being a combination of said third optical signal received on a first combiner input port of said combiner and said fourth optical signal received on a second combiner input port of said combiner;

wherein the optical signal receiver comprises a phase over modulation source configured to produce a phase over modulation signal to over modulate the phase of one of said first optical signal, said second optical signal, said third optical signal and said fourth optical signal; and wherein said phase over modulation signal exhibits a modulation frequency substantially lower than the modulation frequency of said first data signal and said second data signal.

6. The optical signal receiver of claim 5, further comprising a phase over modulator inserted between said first modulator input port and said first combiner input port or between said second modulator input port and said second combiner input port.

7. The optical signal receiver of claim 5, wherein said phase over modulation source is connected to at least one port of said first data modulator or said second data modulator or said phase over modulator.

8. The optical signal receiver of claim 5 wherein a polarization separator is configured to receive a sixth optical signal at said wavelength and to produce said first optical signal and said second optical signal based on said sixth optical signal.

9. The optical signal receiver of claim 5, wherein said first optical polarization state and said second optical polarization state are about rectilinear optical polarization states.

10. The optical signal receiver of claim 5, wherein said first data modulator and said second data modulator are configured to produce Quadrature Phase-Shift Keying (QPSK) modulations.

11. The optical signal receiver of claim 10, wherein at least one of said first data modulator, said second data modulator and said phase over modulator is a LiNbO3 modulator.

12. The optical signal receiver of claim 10, wherein said first optical signal and said second optical signal carry data, and wherein a modulation frequency of the over modulation is lower than the modulation frequency of the data in a QPSK format.

* * * * *